(12) United States Patent
Garoufalis et al.

(10) Patent No.: US 10,166,474 B2
(45) Date of Patent: Jan. 1, 2019

(54) MULTI-PLAYER GAMING SYSTEM WITH REFLECTIVE DISPLAY ASSEMBLY

(71) Applicant: Bally Gaming, Inc., Las Vegas, NV (US)

(72) Inventors: Nicholas Matthew Garoufalis, Chicago, IL (US); Robert James Glenn, II, Chicago, IL (US); Paul Michael Lesley, Chicago, IL (US); Timothy C. Loose, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/676,541

(22) Filed: Aug. 14, 2017

(65) Prior Publication Data

US 2018/0050273 A1    Feb. 22, 2018

Related U.S. Application Data

(60) Provisional application No. 62/376,519, filed on Aug. 18, 2016.

(51) Int. Cl.
*A63F 9/24* (2006.01)
*A63F 13/00* (2014.01)
*G06F 17/00* (2006.01)
*G06F 19/00* (2018.01)
*A63F 13/525* (2014.01)
*G07F 17/32* (2006.01)

(52) U.S. Cl.
CPC ........ *A63F 13/525* (2014.09); *G07F 17/3211* (2013.01); *G07F 17/3244* (2013.01); *G07F 17/3286* (2013.01)

(58) Field of Classification Search
CPC .............. A63F 2250/30; A63F 2300/66; A63F 3/00214; A63F 2003/0022
USPC ................................................. 463/17, 31–33
See application file for complete search history.

(56) References Cited

U.S. PATENT DOCUMENTS

| | | |
|---|---|---|
| 4,863,242 A | 9/1989 | Correa |
| 5,221,083 A | 6/1993 | Dote |
| 5,890,962 A | 4/1999 | Takemoto |
| 6,517,437 B1 | 2/2003 | Wells et al. |
| 7,510,475 B2 | 3/2009 | Loose et al. |
| 8,953,248 B2 | 2/2015 | Kitamura et al. |
| 9,092,931 B2 | 7/2015 | Loose et al. |
| 9,230,396 B2 | 1/2016 | Kitamura et al. |
| 9,330,526 B2 | 5/2016 | Kitamura et al. |
| 9,370,720 B1 | 6/2016 | Milligan et al. |
| 9,412,225 B2 | 8/2016 | Kitamura et al. |
| 2003/0094760 A1 | 5/2003 | Motegi et al. |
| 2004/0063482 A1 | 4/2004 | Toyoda |
| 2005/0043090 A1 | 2/2005 | Pryzby et al. |
| 2006/0046821 A1 | 3/2006 | Kaminkow et al. |
| 2006/0128458 A1 | 6/2006 | Inoue |
| 2008/0018860 A1* | 1/2008 | Hennes ................. G03B 21/28 353/7 |
| 2010/0048288 A1 | 2/2010 | Canterbury et al. |

(Continued)

*Primary Examiner* — Kevin Y Kim
(74) *Attorney, Agent, or Firm* — David J. Bremer

(57) ABSTRACT

A multi-player gaming system includes a reflective display assembly that presents multiple views of a 3D game object as seen from different viewpoints. The reflective display assembly includes a plurality of reflectors the each reflect an image of the 3D game object toward a respective position disposed around the gaming system.

20 Claims, 10 Drawing Sheets

(56) References Cited

U.S. PATENT DOCUMENTS

| | | |
|---|---|---|
| 2010/0144432 A1 | 6/2010 | Nittou |
| 2010/0248808 A1 | 9/2010 | Barker et al. |
| 2011/0092266 A1 | 4/2011 | Kitamura |
| 2012/0115608 A1 | 5/2012 | Pfeifer et al. |
| 2015/0018092 A1 | 1/2015 | Kitamura et al. |
| 2016/0253870 A1 | 9/2016 | Gagner et al. |

* cited by examiner

MULTI-PLAYER GAMING SYSTEM WITH REFLECTIVE DISPLAY ASSEMBLY

RELATED APPLICATIONS

This patent application claims the benefit of priority to U.S. Provisional Patent Application Ser. No. 62/376,519 filed on 18 Aug. 2016 and entitled "Multi-Player Gaming System With Reflective Display Assembly," the contents of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2017, Bally Gaming, Inc.

FIELD OF THE INVENTION

The present invention relates generally to gaming systems, apparatus, and methods and, more particularly, to multi-player game display systems.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Additionally, there exists the technical challenge to push the envelope of familiar gaming apparatus and games played thereon by employing technological components in unconventional ways to present the advanced graphics, special effects, and innovative game formats to a wider audience, measured in both variety and numbers. Expanding game play of the current generation of innovative games to multiple players and augmenting its presentation beyond a standalone EGM or bank of EGMs may enhance both the financial viability of the gaming industry and the entertainment value of the gaming experience.

As the industry matures, the creativity and ingenuity required to improve such operation of gaming apparatus and games grows accordingly.

SUMMARY OF THE INVENTION

According to one aspect of the present invention, a gaming system comprises an electronic display device facing a display direction and game logic circuitry configured to display, on the electronic display device, a plurality of individual views of a three-dimensional (3D) object related to a game conducted by the game-logic circuitry on the gaming system. Each of the individual views may show the 3D object from a different viewpoint. The gaming system may further comprises a plurality of reflectors proximate the electronic display device along the display direction. Each reflector of the plurality is directed toward a respective one of a plurality of positions disposed around the electronic display device, and the reflectors are configured to reflect one of the individual views of the 3D object toward the respective position.

According to another aspect of the invention, a method of displaying a 3D object to multiple players in a gaming system is claimed. The gaming system includes an electronic display device facing a display direction and a plurality of reflectors proximate the electronic display device. Each reflector of the plurality is angled obliquely to the display direction and is directed to one of a plurality of positions disposed around the electronic display device. The method comprises directing, by game-logic circuitry of the gaming system, the electronic display device to display a plurality of views of the 3D object with each view showing the 3D object from a different viewpoint. The method further comprises reflecting, by respective ones of the plurality of reflectors, respective views of the 3D object toward the plurality of positions.

According to still another aspect of the invention, a gaming system comprises an electronic display device facing a display direction, and a 3D-object viewing application configured to capture a plurality of simultaneous views of a virtual 3D object related to a game in a 3D environment. Each of the plurality of simultaneous views shows the 3D object from a different viewpoint in the 3D environment. The gaming system further comprises game-logic circuitry configured to initiate a game among multiple players positioned at a plurality of positions disposed around the electronic display device, randomly determine a game outcome, and cause the 3D game object to move in response to the randomly determined game outcome. Also, the game-logic circuitry directs the electronic display device to display the plurality of simultaneous views of the moving 3D game object.

Further, the gaming system comprises a plurality of reflectors proximate the electronic display device with each reflector angled obliquely to the display direction. Each of the reflectors is directed at a respective one of the plurality of positions and reflects one of the simultaneous views of the moving 3D game object toward the respective position.

Additional aspects of the invention will be apparent to those of ordinary skill in the art in view of the detailed description of various embodiments, which is made with reference to the drawings, a brief description of which is provided below.

Figure 1:
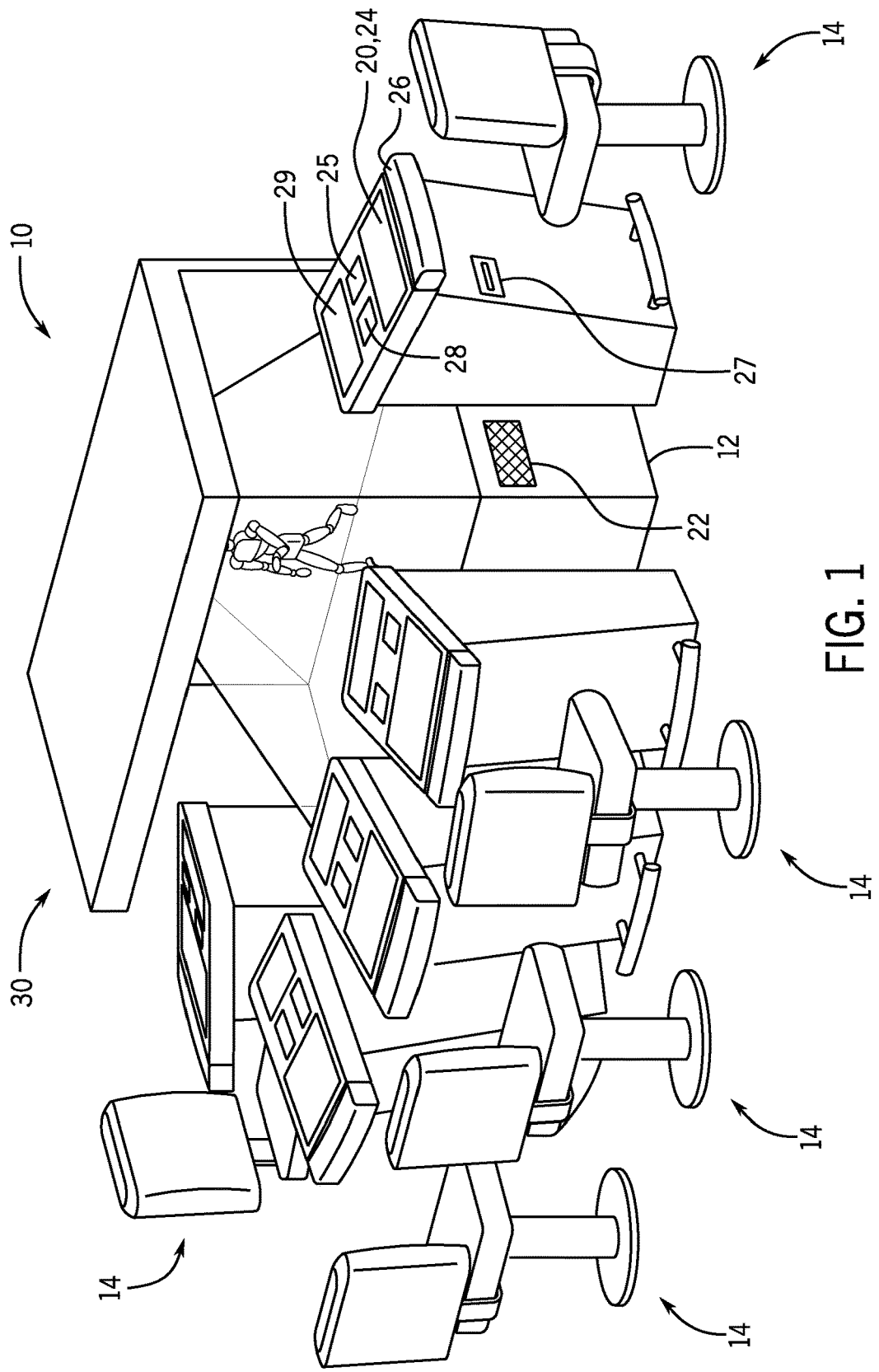
FIG. 1 is a perspective view of a free-standing multi-player gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 configured for operation in gaming establishments, such as casinos. In the context of the present invention, the gaming machine 10 may be any type of gaming terminal or machine and may have varying structures and methods of operation. For example, in some aspects, the gaming machine 10 is a multi-player gaming terminal configured to play a video casino game, such as slots, keno, poker, blackjack, roulette, craps, etc. The gaming machine 10 may take any suitable form, such as floor-standing multi-player station as shown, a surrounded centerpiece display, stadium-style game stage, etc. Further, the gaming machine 10 may be primarily dedicated for use in playing wagering games, or may include non-dedicated devices, such as mobile phones, personal digital assistants, personal computers, etc.

The gaming machine 10, and other embodiments of the invention, utilize a reflective display assembly 30 to entertain and communicate with multiple players arrayed around the display assembly using a pseudo-holographic image of a 3D object reflected in a plurality of reflectors. The reflective display assembly depicts the 3D object from various viewpoints simultaneously so that an observer at one position sees a different (and positionally appropriate) viewpoint than another observer at a different position. The novel application of the reflective display technology combined with innovative 3D game-play elements engages the players individually and collectively through focused interactions via the pseudo-holographic visual presentation.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 may be considered to include a plurality of player stations such as player station 14, and one or more components of the gaming machine 10 described herein may reside in one or more player stations 14. Such a distribution of components is understood to be within the scope of a gaming machine 10. A notification mechanism, such as a candle or tower light, may be mounted to the top of the cabinet 12. It flashes to alert an attendant that change is needed, a hand pay is requested, or there is a potential problem with the gaming machine 10.

The input devices, output devices, and input/output devices may be disposed on, and/or securely coupled to, the cabinet 12 and/or the player stations 14. By way of example, the output devices include a primary reflective display assembly 30, one or more secondary displays 20 (mounted to the player stations, in this embodiment), and one or more audio speakers 22. The secondary display 20 may be a mechanical-reel display device, a video display device, or a combination thereof in which a transmissive video display is disposed in front of the mechanical-reel display to portray a video image superimposed upon the mechanical-reel display. Also, a secondary display may be a community display mounted for visibility to a plurality of players/observers. The displays variously present information and images associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the secondary display(s) 20, buttons 26 on a button panel, a bill/ticket acceptor 28, a card reader/writer 25, a ticket dispenser 27, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device 29, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 may include one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 25, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 25, the ticket dispenser 27 for printing tickets redeemable for cash or credits, a wireless communication interface for transmitting cash or credit data to a nearby mobile device, and a network interface for depositing cash or credits to a remote account via an electronic funds transfer.

Figure 2:
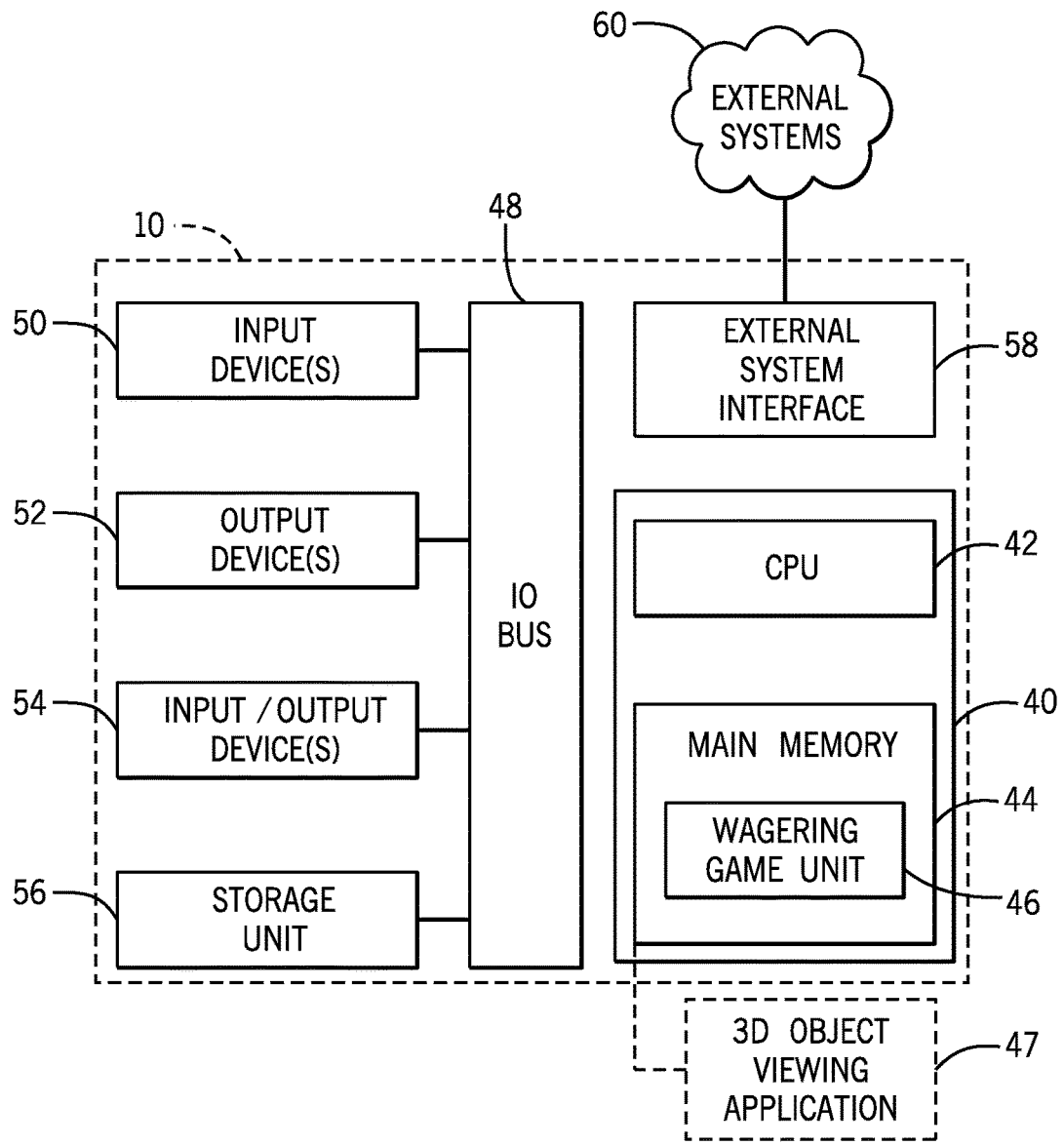
FIG. 2 is a schematic view of a gaming system according to an embodiment of the present invention.

Referring to FIG. 2, there is shown a block diagram of an embodiment of gaming-machine architecture. The gaming machine 10 includes game-logic circuitry 40 including a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The game-logic circuitry 40 may further include a 3D object-viewing application 47 configured to provide images of a 3D object seen from a plurality of different viewpoints. The 3D object-viewing application 47 may comprise executable instructions residing in main memory 44 or may comprise a separate component accessed as part of an external system (described below). The 3D object-viewing application 47 may interact with an independent 3D rendering module to capture images from virtual cameras proximate a 3D object in a virtual environment. The virtual cameras may capture dynamic real-time or near-real-time images of the 3D object as it is manipulated by the 3D rendering module. In an embodiment, the 3D object-viewing application includes a resident 3D rendering module and dedicated memory storage in which the 3D object files and supporting data reside. In an embodiment, the 3D object-viewing application may be a commercially available software application such as a Unity® product from Unity Technologies.

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. Similarly, the player stations 14 may operate as thin, thick, or intermediate clients to the gaming machine 10. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting an exemplary game on a gaming system in accord with the present concepts, the game includes a game sequence in which a player makes a wager and a game outcome is provided or displayed in response to the wager being received or detected. The game outcome, for that particular game instance, is then revealed to the player in due course following initiation of the game. The method comprises the acts of conducting the game using a gaming apparatus, such as the gaming machine 10 depicted in FIG. 1, following receipt of an input from the player to initiate a game instance. The gaming machine 10 then communicates the game outcome to the player via one or more output devices (e.g., reflective display assembly 30 or secondary display 20) through the display of information such as, but not limited to, text, graphics, static images, moving images, etc., or any combination thereof. In accord with the method of conducting the game, the game-logic circuitry 40 transforms a physical player input, such as a player's pressing of a "DRAW" touch key, into an electronic data signal indicative of an instruction relating to the game (e.g., an electronic data signal bearing data).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the game, causes the primary display 30, other display device, or other output device (e.g., speakers, lights, communication device, etc.) to change from a first state to at least a second state, wherein the second state of the output device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random outcome.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Referring once more to the embodiment shown in FIG. 1, the gaming machine 10 may conduct a multi-player game with players around the reflective display assembly 30, and display elements of the game both to players seated at the player stations 14 and to observers (or players) positioned around the player stations in view of the display assembly 30. Various games, bonus features, and game-types may be presented in conjunction with the gaming machine 10. Casino card games such as poker, blackjack, pai gow, and baccarat, to name only a few, can be presented to a multi-player audience via implementation on the display assembly 30 and/or other display devices to engage the players. Table games like roulette and craps may similarly benefit from the presentation capabilities of the gaming machine 10. Other card games, dice games, video wagering games, etc. may be successfully adapted to presentation via the gaming machine 10 and other embodiments.

Figure 3:
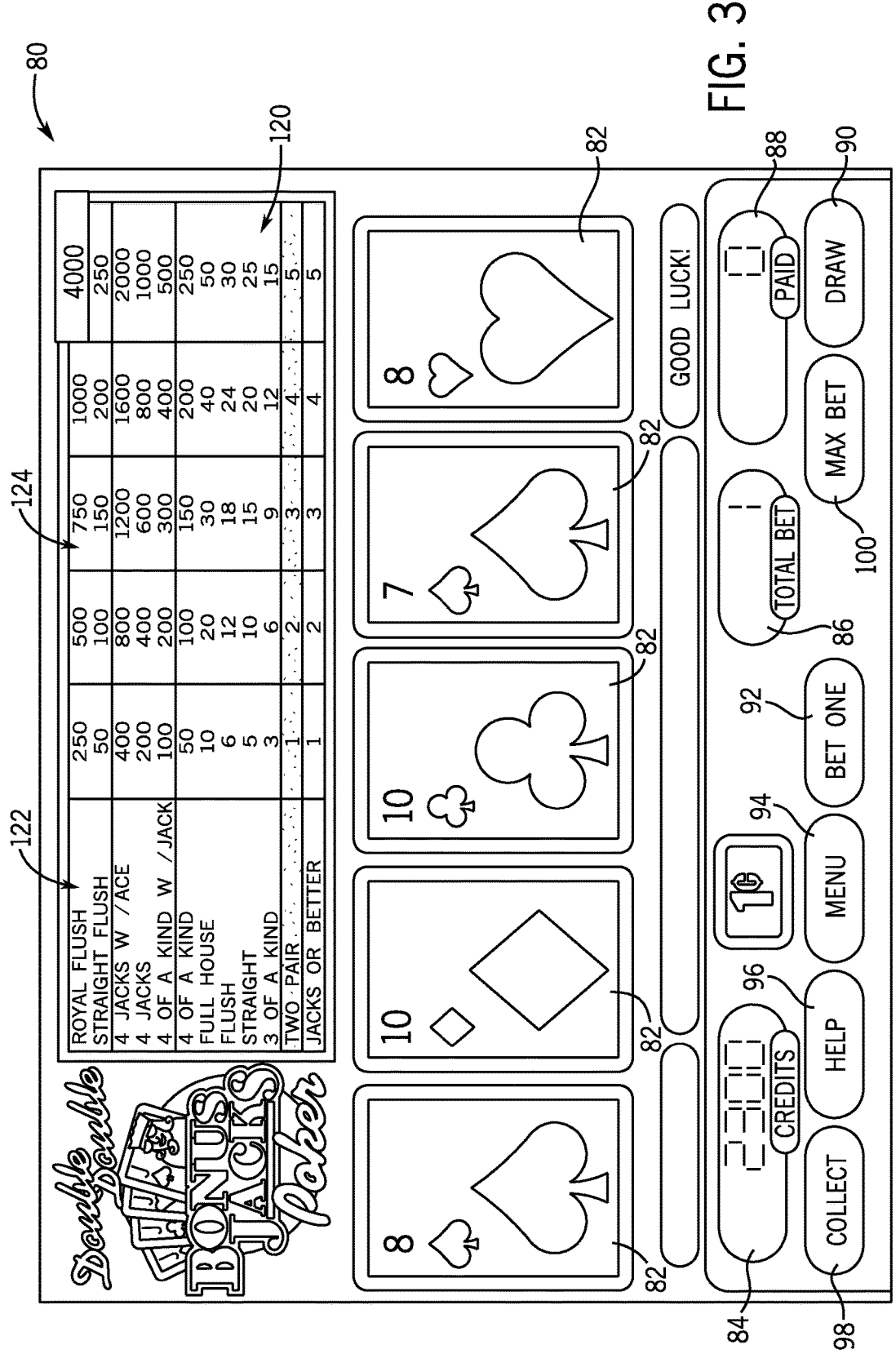
FIG. 3 is an image of an exemplary basic-game screen of a wagering game displayed on a gaming machine, according to an embodiment of the present invention.

Referring now to FIG. 3, there is illustrated an image of a basic-game screen 80 for a poker-type game adapted to be displayed on a display device such as the secondary display 20 (see FIG. 1). The basic-game screen 80 also advantageously displays one or more touch screen buttons 90-100 adapted to be actuated by a player. A player can operate or interact with the wagering game using these touch screen buttons or other input devices such as the buttons 26 shown in FIG. 1. The game-logic circuitry 40 operates to execute a wagering-game program causing the secondary display 20 to display the poker hands on a station display device at each player station. In an embodiment, the poker hands may be displayed on the reflective display assembly 30.

The basic-game screen 80 includes five playing cards 82, game session meters 84-88, various buttons 90-100 selectable by a player, and a pay table 120. The game session meters include a "credits" meter 84 for displaying a number of credits available for play on the machine; "bet" meter 86 for displaying a number of credits wagered (e.g., from 1- to 5 credits); and a "win" meter 88 for displaying a number of credits won as a result of the most recent play.

The player-selectable buttons include a "deal"/"draw" button 90 for causing the game to initially deal cards from a deck into a hand and for later causing the game to draw cards from a deck to replace any non-held cards in the hand; a "bet one" button 92 for wagering one credit for each press of the button; a "menu" button 94 for accessing extra functions such as a viewing a paytable; a "help" button 96 for viewing instruction on how to play the video poker game; a "collect" button 98 for collecting any credits remaining on the credits meter at the end of a game session; and a "max bet" button 100 used to bet a maximum number of credits (e.g., 5 credits) without having to repeatedly press the "bet one" button 92. The pay table 120 is preferably positioned above the playing cards 82. The pay table 120 includes a list of winning poker hand rankings 122 and the number of credits won 124 for each ranking.

In an exemplary game, such as a poker game, the reflective display assembly provides a pseudo-holographic image of a 3D virtual dealer. The dealer appears to be facing an observer from the front-mounted reflector. From the other two reflectors (e.g., the right and left sides), the dealer is seen from either the right or left side, respectively. As game-play moves from one position to another, the dealer may turn to their left or right to deal cards or to address one or more players at the respective player stations. As such, players may feel individually engaged by the virtual dealer as if they were participating in a table game with a human dealer. Dealt cards may be visible on game screens such as the game screen 80 on the secondary display 20 depicted in FIG. 3 and/or on the reflectors of the reflective display assembly. In an embodiment, game elements of a base game are displayed on the secondary display 20 and bonus game elements are displayed on the reflective display assembly 30.

The configuration of the reflectors and the characteristics of the reflectors can be utilized to manipulate the reflective and transmissive qualities (i.e., the apparent solidity and/or transparency) of the 3D object presented by the reflective display assembly. In an embodiment, the 3D object may appear to be floating within the display assembly when viewed on any of the reflectors.

Figure 4:
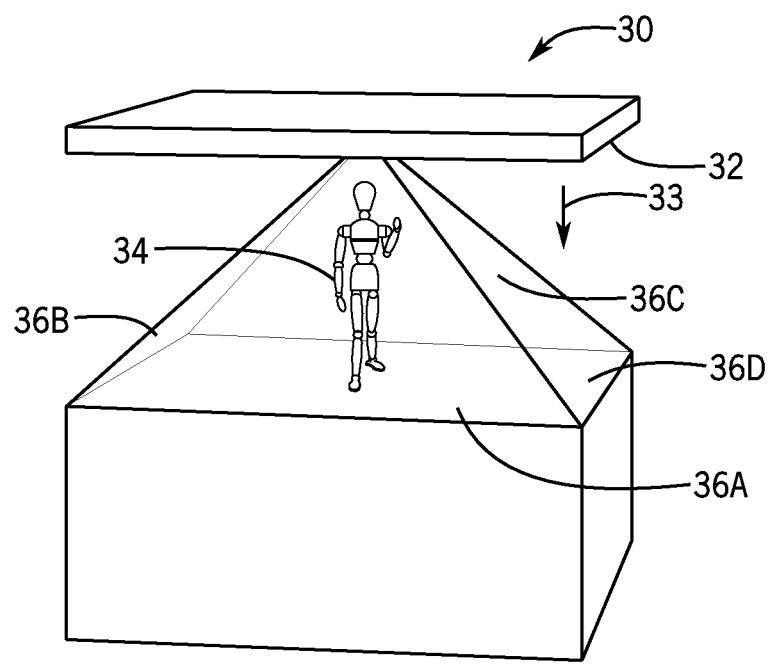
FIG. 4 is a perspective view of a reflective display assembly according to an embodiment of the present invention.

Referring now to FIG. 4, there is shown an exemplary reflective display assembly 30 such as may be used in the gaming machine 10 of FIG. 1. The reflective display assembly 30 includes a primary display device 32 with its screen facing in a downward display direction 33 in this embodiment. Below the primary display device 32 along the display direction 33, the display assembly 30 includes a plurality of reflectors 36A-D arranged in a four-sided pyramidal configuration with each reflector 36A-D positioned at an oblique angle (i.e., neither a right angle nor a multiple of a right angle) to the display direction 33. The reflectors 36A-D are shown angled approximately 45 degrees from the display direction 33, but reflectors may be positioned at other oblique angles. The display device 32 is positioned with its center point substantially incident with the theoretical apex of the pyramid. In an embodiment, the display device 32 may be configured with its screen facing in an upward direction or in another direction. In any case, the plurality of reflectors will be positioned proximal to the display device and along the display direction. A reflector may comprise various materials that reflect at least some incident light.

A configuration of a reflective display assembly may be manipulated in various way to produce particular effects or to enhance certain aspects of the player experience. Two, three, four, or more reflectors may be utilized in a display assembly. A display assembly may be divided by an opaque surface and separated reflectors may present unrelated images. For example, a four-sided pyramid assembly may be divided down the center to form two rectangular formations. Each rectangular section may provide three distinct reflector positions at which players may view a 3D object related to a game, with the three reflector positions on the opposite side of the opaque divider presenting a different 3D object and/or a different game. Reflectors may be positioned at the same oblique angle, or reflectors in a single reflective display assembly may be angled differently with respect to each other and the display direction. Different angles may result in improved visibility for players at some or all player positions. Different angles may alter the reflected image, for example, dimensional relationships may change (elongate, compress, etc.). The reflectors may be substantially flat or may be curved. Images on the display device may be adapted to enhance or offset the configuration of the reflectors. For example, keystone corrections may be applied to the displayed images to modify the reflected images. Various other image processing and reflector configuration adjusting will be apparent to one having skill in the art and are considered to be within the scope and spirit of the invention.

The display device 32 may include a single display screen. Alternatively, the display device 32 may comprise a plurality of separate screens. In an embodiment, the display device includes four separate display screens positioned adjacently to comprise the total screen area. Multiple display screens may be controlled by common display circuitry and may be controlled separately by respective display circuitry.

In a configuration, any image displayed on the display device 32 will be at least partially reflected outwards from the display direction 33 by one or more of the plurality of reflectors 36A-D, depending on a position of the image on the screen. In FIG. 4, the reflected image of the 3D object 34 is visible on the reflector 36A (and also reflected by, but not shown in FIG. 4, on reflectors 36B-D).

Figure 5:
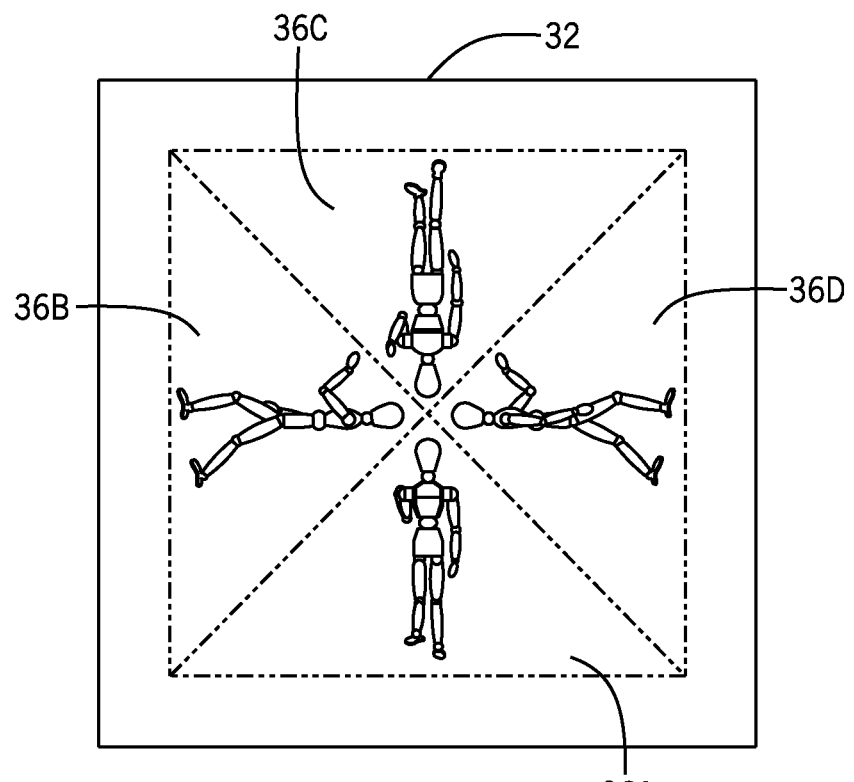
FIG. 5 is a plan view of a display device with multiple images overlaying a footprint of a pyramidal arrangement of reflectors.

Responsive to placement of images on the screen of display device 32, particular individual images can be reflected on each of the plurality of reflectors 36A-D. FIG. 5 is a top view looking through the display device 32 onto the reflectors 36A-D. The phantom lines indicate the approximate regions of the display screen that will be reflected on the respective reflectors. It will be recognized that the dimensions and configuration of the reflectors may result in a different division of the display screen. For example, a three-sided pyramid would require a different image configuration in order to present distinct images on respective reflectors. Similarly, a larger or smaller pyramid may require an altered image arrangement. Also, the display screen(s) may be skewed with respect to the reflectors (e.g., the sides of the pyramid may not be parallel to the sides of the display screens).

The reflective display assembly may be configured in various ways that may enhance some aspects of the display presentation and/or diminish some negative characteristics to improve the overall player experience. In an embodiment, the display device may include multiple separate display screens instead of a single screen. Also, separate display screens may be operated by independent video controllers providing increased flexibility and enhanced display capabilities that a single screen embodiment. For example, in use with a four-sided pyramidal reflector assembly, a four-screen display device can be rotated approximately 90° about the display direction so that the edges of the adjacent screens roughly coincide with the edges of the reflectors in the reflector assembly. In such an embodiment, the display screens may provide more useful area aligned with corresponding reflectors.

Figure 6:
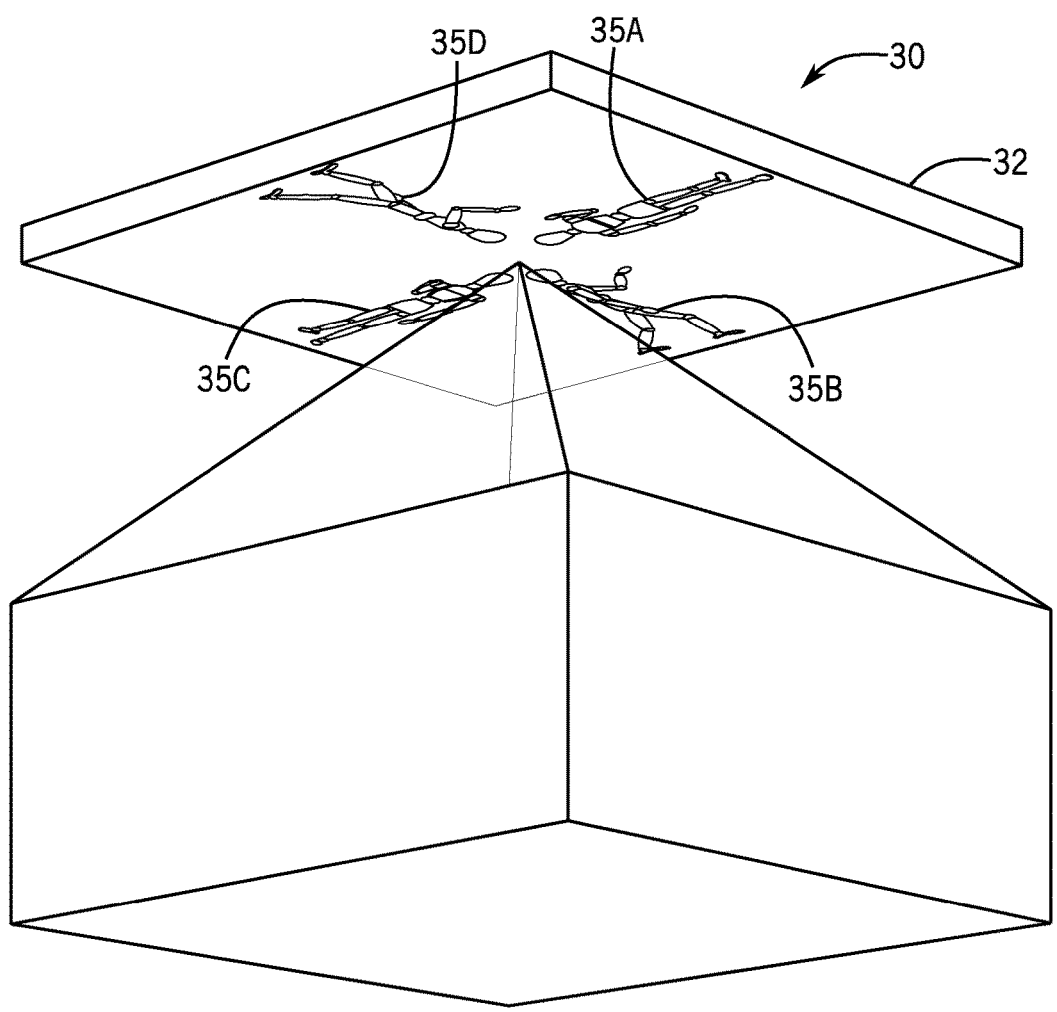
FIG. 6 is a perspective view of a reflective display assembly with a downward-facing display device according to an embodiment of the present invention.

Referring now to FIG. 6, an embodiment of the gaming machine 10 utilizes the reflective display assembly 30 to create a pseudo-holographic effect for players and bystanders around the gaming machine 10. The display device 32 displays an image comprising individual views 35A-D of an object (or virtual object) from different viewpoints. The individual views 35A-D are positioned on the display screen so that each view is reflected on a respective reflector 36A-D. In an embodiment, the individual views may be derived from virtual cameras positioned at different viewpoints around a 3D object in a virtual environment. For example, the 3D object 34 of FIG. 4 is depicted on the display device 32 from four different viewpoints 35A-D, representing a left view, back view, right view, and front view, respectively. In the configuration shown, the viewpoints 35A-D will be reflected in reflectors 36A-D, respectively, and this provides players at particular positions around the reflective display assembly 30 (e.g., left, back, right, or front) with views of the 3D object that simultaneously correspond with each position.

Figure 7:
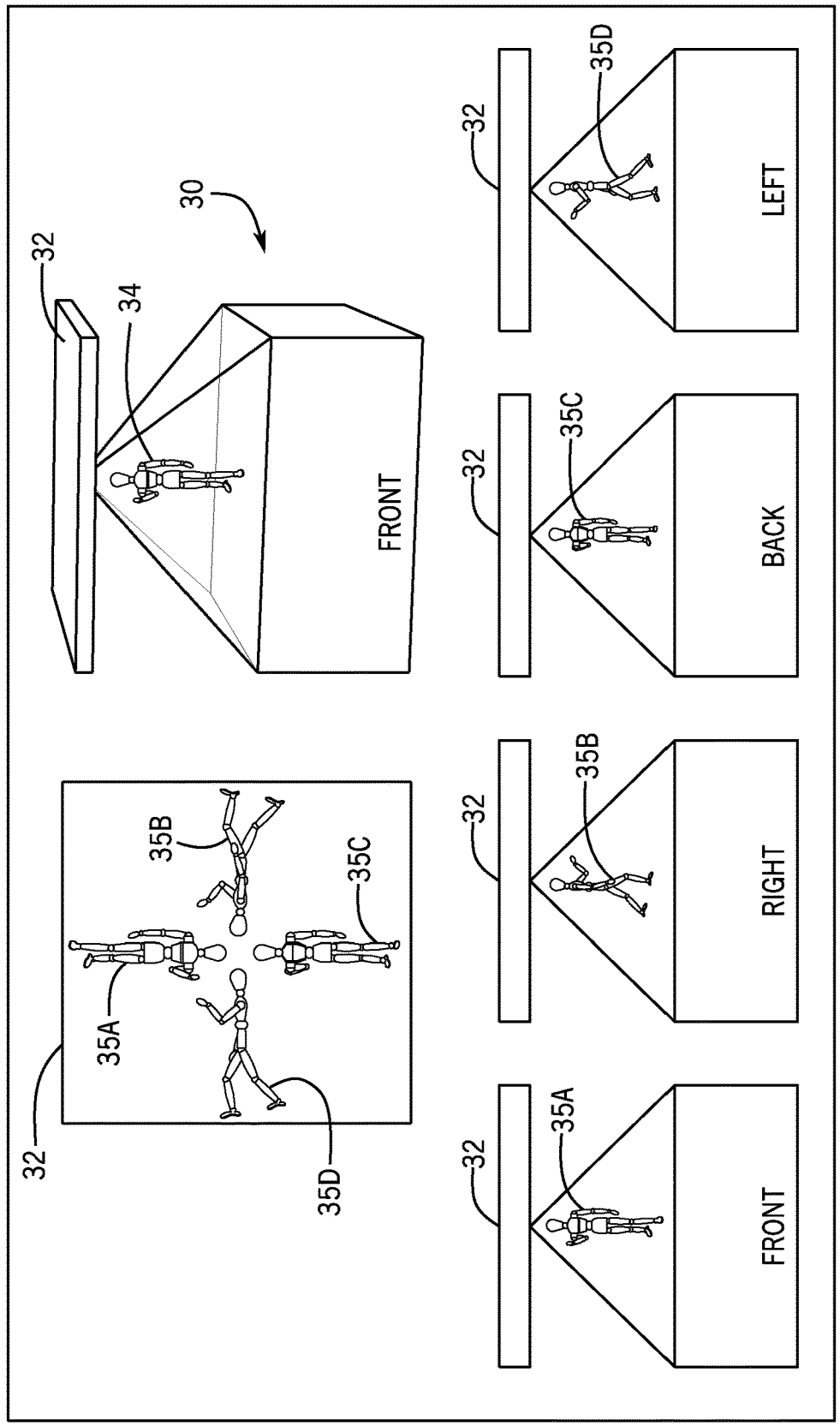
FIG. 7 depicts views of a reflective display assembly and the reflected images seen from specific positions around the display assembly, according to an embodiment of the present invention.

FIG. 7 presents a tableau of views that illustrate how the individual images shown on the display device are reflected in respective reflectors of the assembly. In the top row are shown a view of the display device 32 with four individual images of a 3D object 34 (human figure) and also a perspective view of a pyramidal reflective display assembly presenting the 3D object 34. In the bottom row are separate views of each side of the reflective display assembly 30 including, respectively, a front, right, back and left side. Each side view demonstrates the different viewpoint of the 3D object 34 that corresponds with the particular side. As shown, players at front side, for example, see the 3D object 34 from the viewpoint of a virtual camera designated as the front camera and players at the other sides simultaneously see the 3D object 34 from their respective corresponding viewpoints. Since the 3D object 34 is effectively unitary (i.e., all of a piece, whether virtual or actual), any movements by the 3D object 34 will be accurately reflected in all the different viewpoints in "real time" and the players will experience the display effect accordingly.

A reflector(s) in a reflective display assembly may have different reflective characteristics depending on a number of different (and sometimes variable) qualities. For example, a reflector may be treated to vary reflectivity and/or transparency (e.g., "half-silvered"). A coating or film may be applied to an inner or outer surface of a reflector to alter how images are reflected. Some treatments/materials may cause a reflector to reflect most or all light (i.e., mirror-like or specular reflection). Other treatments/material will reflect and transmit different percentages of light. Even transparent material like clear glass will reflect some light and the amount of light reflected may depend on an incident angle of the light with respect to the reflector surface. Reflector characteristics may be tweaked to blend with ambient or internal lighting to produce a desired effect, such as to enhance the pseudo-holographic appearance of the reflected images. Some reflector characteristics may vary with incident light angles and/or observer position. "Privacy film" applied to a display device screen may stop players from being distracted by a glimpse of the images on the display device—preventing players from "peeking behind the curtain." For example, a display screen may be treated with privacy film that blocks viewing an image except within a specified range of viewing angles (i.e., the angle between a viewer's line-of-sight and the reflector or display surface). Various films, coating, materials, lighting effects may be employed with the reflective display assembly to enhance and control a player's viewing experience.

Partial reflection of an image may enable a player to see both the reflected image and any items behind the reflector surface. For example, if two players are positioned on opposite sides of a reflective display assembly, a player may see the reflected image of the 3D object and also see the opposite player through the reflector. It may be desirable for the player to see players and objects behind the reflector, for example, to enhance the "holographic" appearance of the reflected image. Conversely, it may be deemed preferable to prevent viewing through the reflectors. A pyramidal assembly may include additional objects within the pyramid and these object may be visible to the players looking through the reflectors. Various abovementioned characteristics of a reflective display assembly can be manipulated to attain a range of desired effects.

Transmissive display devices may be implemented with a reflective display assembly to selectively provide additional visual elements. Transmissive display devices as used here and throughout include various flat panel transmissive displays (e.g., LCD, LED, OLED, etc.) which may be substantially transparent when inactive but may selectively superimpose graphical elements over a reflector in a reflective display assembly. Some types of transmissive displays and exemplary applications of transmissive displays may be found in U.S. Pat. No. 6,517,433 to Loose, which is hereby incorporated by reference in its entirety. In an embodiment, a transmissive display device may provide an additional, independent platform for graphical images that may be viewed on/through the reflective display assembly. For example, a transmissive display could superimpose a visual effect to introduce a targeted bonus feature to a player at a particular position. Players at other positions may be intentionally uninformed about the targeted bonus, or may be able to see the visual effect through their respective reflectors, dependent on the game-logic controlling the displays. Similarly, in an embodiment, it may be desirable to display graphics and/or information that is confidential or, at least, intended for a particular player exclusive of others. In such a case, it may be advantageous to present the confidential elements on a transmissive display associated with a particular position. Alternatively, visual effects may be introduced on the transmissive displays purely for entertainment or for information during play of the game. For example, in a game having a virtual dealer displayed on the reflective display assembly, a swarm of bees presented in the transmissive display screens may appear to harass the dealer during game play. Transmissive display screens may be positioned in various locations, for example, between the display device and a reflector, behind or in front of a reflector, distal a reflector between the reflector and a player, etc. Different positions may produce varying visual effects.

Figure 8:
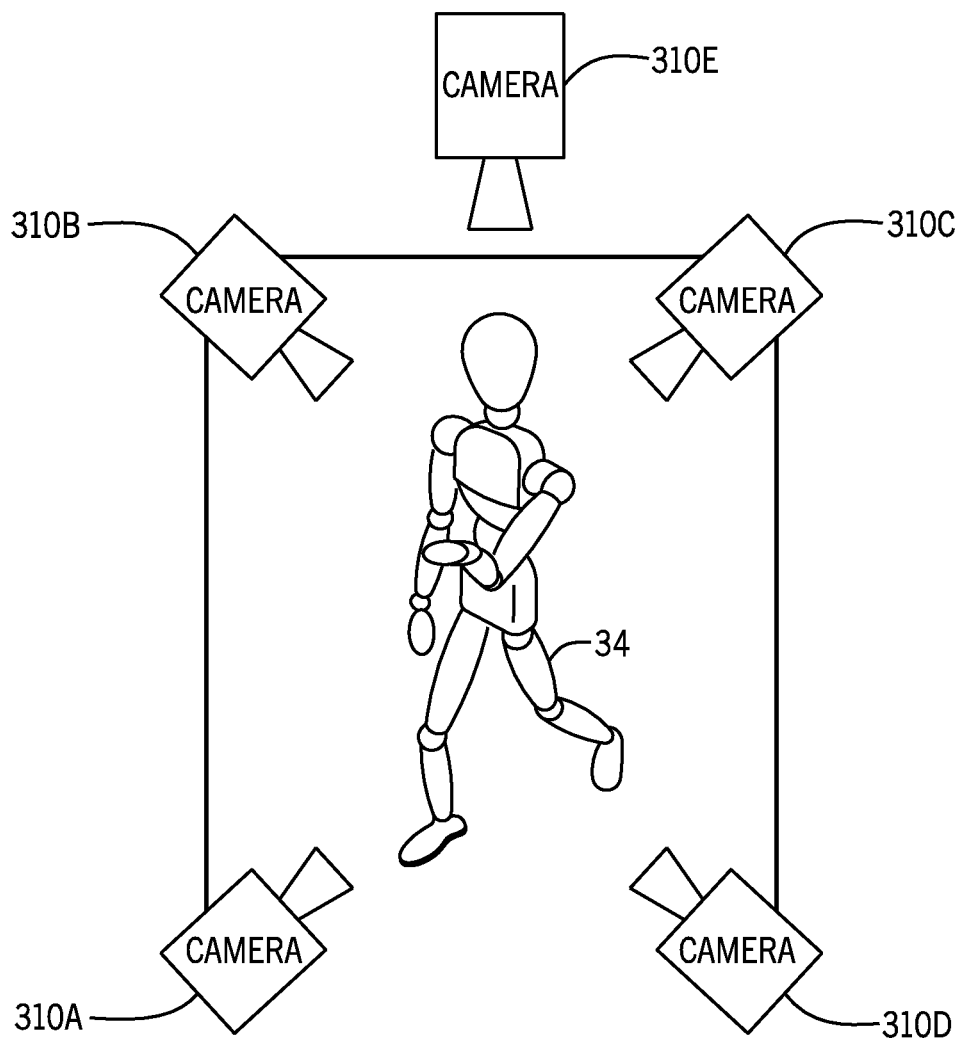
FIG. 8 is an image of a virtual 3D object in computer-space with multiple virtual cameras positioned at different viewpoints.

Referring now to FIG. 8, there is depicted the 3D object 34 in a virtual 3D environment, such as may be created using a computer-aided design software application like Solid-Works®, Blender, Maya®, Modo®, etc. The 3D object 34 is surrounded in the 3D environment by virtual cameras 310A-E that capture video images of the 3D object 34 from different viewpoints (e.g., left, back, right, front, overhead). In the embodiment shown in FIG. 6, the video images captured by each virtual camera 310A-D are displayed as individual viewpoints 35A-D, respectively, on the display device 32 and reflected in the corresponding reflectors 36A-D. More or less cameras may be utilized to provide different viewpoints to players and/or observers. For example, in an embodiment, an overhead camera 310E may capture a "bird's eye" view of the 3D object 34.

The pseudo-holographic (i.e., three-dimensional) appearance of the images on the reflectors may be enhanced by various characteristics of the reflective display assembly and/or the environment surrounding the reflective display assembly. For example, ambient and internal lighting may be manipulated to produce particular effects. Direct, bright light on the pyramidal display may detract from the desired effect, so muted, indirect lighting may be preferred. The lighting and image color palettes may be selected for maximum effect and contrasting/complementary colors can be implemented to create a favorable scene.

While the reflected images of the reflective display assembly appear nearly contiguous (or, at least, positionally consistent) when viewed from distinct positions around the reflective display, sightlines along the junction of adjacent reflectors can reveal discontinuities that detract from the desired illusion. However, masking treatments at the reflector joints, even as simple as an opaque cover strip concealing the joint, may distract the eye such that the illusion is maximally maintained. Similarly, concealing the display screen by physical shielding or by selective positioning of the players may aide in sustaining the mystery of the presentation.

Figure 9:
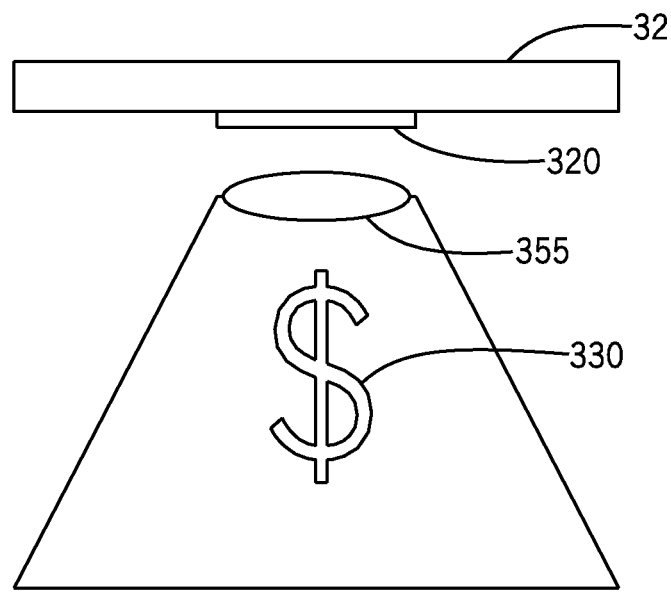
FIG. 9 is a side-view depiction of a reflective display assembly according to an embodiment of the present invention.

In one embodiment including a pyramidal reflector assembly, the display screen area reflected by the sides of the pyramid decreases rapidly near the apex and the pyramid may ascend to a truncated, flat top instead of a point without sacrificing significant usable area. A truncated pyramid may provide a more compact form-factor as well as an opportunity for additional display features/characteristics. FIG. 9 depicts a side view of a reflective display assembly including a truncated pyramid of reflectors with the primary display screen 32 centered at the theoretical apex of the truncated pyramid. In the embodiment of FIG. 9, the display screen 32 is augmented with a separate display screen 320 positioned centrally on the larger primary display screen 32. The primary display screen 32 displays images (not shown) of 3D object 330, which is seen reflected at one position. The pyramid further includes a lens 355 affixed to the top surface of the truncated pyramid to focus and project the image displayed on screen 320 onto the inner floor of the pyramid. The lens may be configured to provide various effects. In another embodiment, the separate display screen may be connected to the truncated pyramid, either outside or inside of the top surface of the truncated pyramid.

Figure 10:
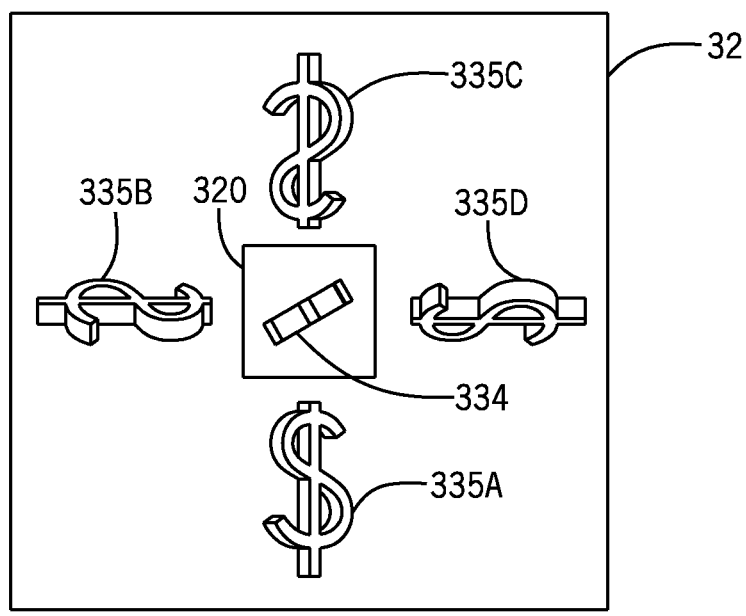
FIG. 10 is a plan view of a display device including a separate display screen with a central image according to an embodiment of the present invention.

As shown in FIG. 10, the display screen 320 adds a central image 334 to the array of viewpoints 335A-D provided by screen 32. The central image 334 is an overhead view of the 3D object 330. The surrounding images 335A-D will be reflected from the corresponding reflectors the pyramidal assembly but the central image 334 is projected through the truncated top surface (and the lens 355) onto the floor of the pyramidal assembly and simulates a shadow cast by an overhead light source. In another embodiment, the central image may be independent of the 3D object depicted in the other images or may be an independently derived simulation of all or a part of the 3D object.

Figure 11:
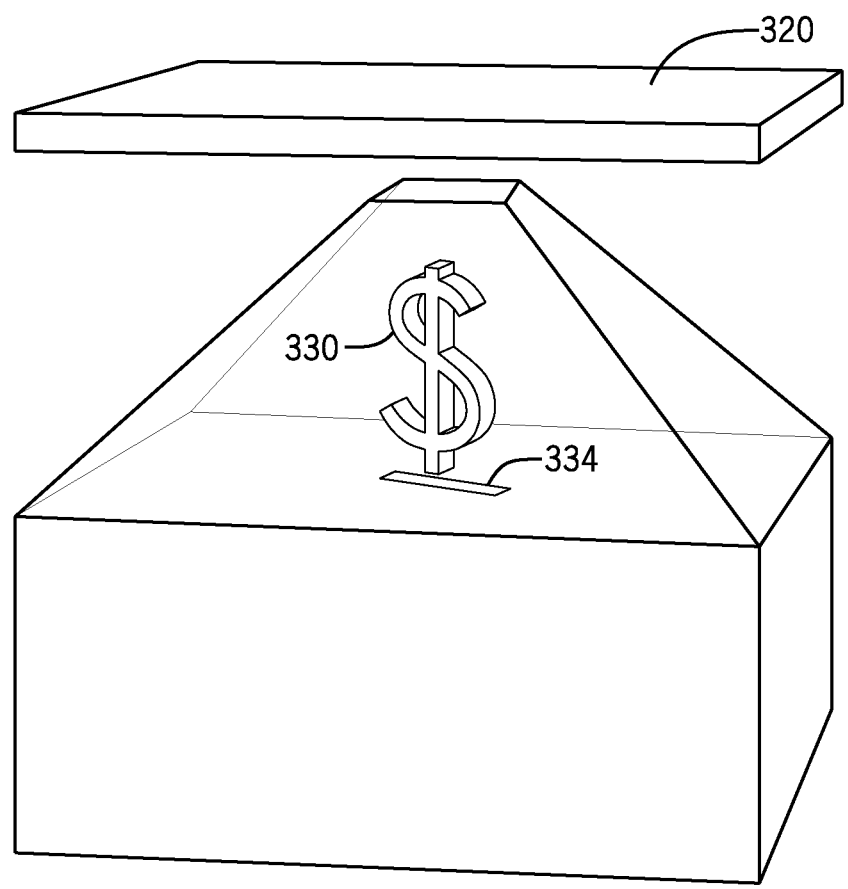
FIG. 11 is perspective view of a reflective display assembly including a centrally-projected shadow image according to an embodiment of the present invention.

Referring now to FIG. 11, there is shown a perspective view of an embodiment similar to that shown in FIG. 9 in which the "shadow" image 334 is visible on the floor of the pyramid. If the 3D object 330 moves in the 3D environment (e.g., rotates), the "shadow" 334 may also rotate to enhance the illusion that the image in the reflector is a solid or holographic object. The image 334 may be projected on various surfaces within the reflective display assembly other than the floor. For example, the image 334 may be focused by the lens 355 on a raised surface like a picture frame or other figure within the assembly.

One having skill in electronic display art will recognize further configuration and control variations that may be adapted for use in a reflective display assembly and such variations are considered to be within the scope and spirit of the current invention.

A 3D object, such as 3D object 34, may be animated, for example, via program commands executed by game-logic circuitry, to perform gestures and movements in the 3D environment, and the virtual cameras 310A-D can capture and accurately depict the animation from each respective viewpoint 35A-D. Similarly, the 3D object may be animated via stored routines and/or stored video files. When the various viewpoints are displayed at the reflective display assembly 30, players see a pseudo-holographic animation of the 3D object 34 from their respective positions. For example, the 3D object may move responsive to the randomly determined outcome of a game and the players viewing the moving 3D object may be informed of aspects of the randomly determined outcome. In an embodiment, the 3D object comprises a pair of dice which, when are moved about the 3D environment and display an aspect of the game outcome on the die faces when they come to rest. Also, in an embodiment, the 3D object may comprise a spinning roulette wheel that displays an outcome via the roulette ball landing in a particular slot on the roulette wheel.

In an embodiment, the video images from the virtual camera 310A-D are processed and synchronized by the 3D object-viewing application 47 which delivers final video images in a form suitable for display on the display device 32. The 3D object-viewing application 47 may be resident in main memory on the gaming machine 10 or may reside on a server or other external system component. The 3D object-viewing application 47 may be integrated with a computer-aided design software application or may be a standalone application.

The 3D object 34 may be animated to perform game-related actions and may actually or apparently interact with players during game play. In an embodiment that presents a card game, the 3D object may depict a dealer (e.g., human-like, a cartoon character, anthropomorphic object, etc.) which "deals" cards to each player or to a plurality of player positions. While dealing, the 3D object may turn to face active player positions and even communicate directly with respective players audibly or via gestures and expressions. A "dealer" may "deal" cards that subsequently are displayed on a secondary display device. For example, a virtual deck of cards may zoom about the display device 32 and appear to fling cards towards a player or player position, only to have cards appear on the secondary display device associated with that player or position. In an embodiment, images of a "live" dealer captured by actual cameras may be displayed and reflected via the reflective display assembly. The images may be presented in real or near-real time and may be pre-recorded. In the case of a live dealer, video clips may be prepared for a plurality of different gestures, movements, and positions corresponding to anticipated game conditions and then triggered by game-logic circuitry when appropriate. Alternatively, a live dealer at a remote location may receive visual or audio cues to direct their interactions with players at the reflective display assembly. Other presentation scenarios using live actors and combinations of actual and virtual objects may be envisioned by one skilled in the art and are considered within the scope and spirit of the invention.

The 3D object may be responsive to inputs from a player. By using one or more input devices compatible with a gaming system (e.g., buttons, joysticks, touchscreens, gesture-sensing devices, etc.) a player may affect how the 3D object behaves before, during, and/or after game play. In an embodiment, a player may shake a virtual dice cup (i.e., 3D object) and roll virtual dice by physically manipulating devices such as buttons or levers. In an embodiment having a gesture-sensing device, the player may affect the 3D object simply by moving the player's hand in the region around the gesture-sensing device. For example, when the player reaches into the region of the gesture-sensing device, a visual depiction of a player's hand may appear within the reflective display device and spin a virtual roulette ball into a roulette wheel. Gesture-sensing devices may detect a variety of physical gestures by a player including hand gestures, head movements, eye blinks and movements, etc., and produce game inputs and other control signals based on the detected gestures.

Inputs may be provided by a mobile device such as a telephone, PDA, or other personal mobile device. Many such device include gesture-sensing components like accelerometers, inclinometers, gyroscopes, etc. and the signals from these components may be utilized as inputs to the gaming system.

In another embodiment, the gaming machine 10 presents a roulette game, and the 3D object may be a roulette wheel that not only rotates about its own axis but gimbals (and gambols) around the reflective display assembly 30 while the ball spins in the roulette bowl.

Figure 12:
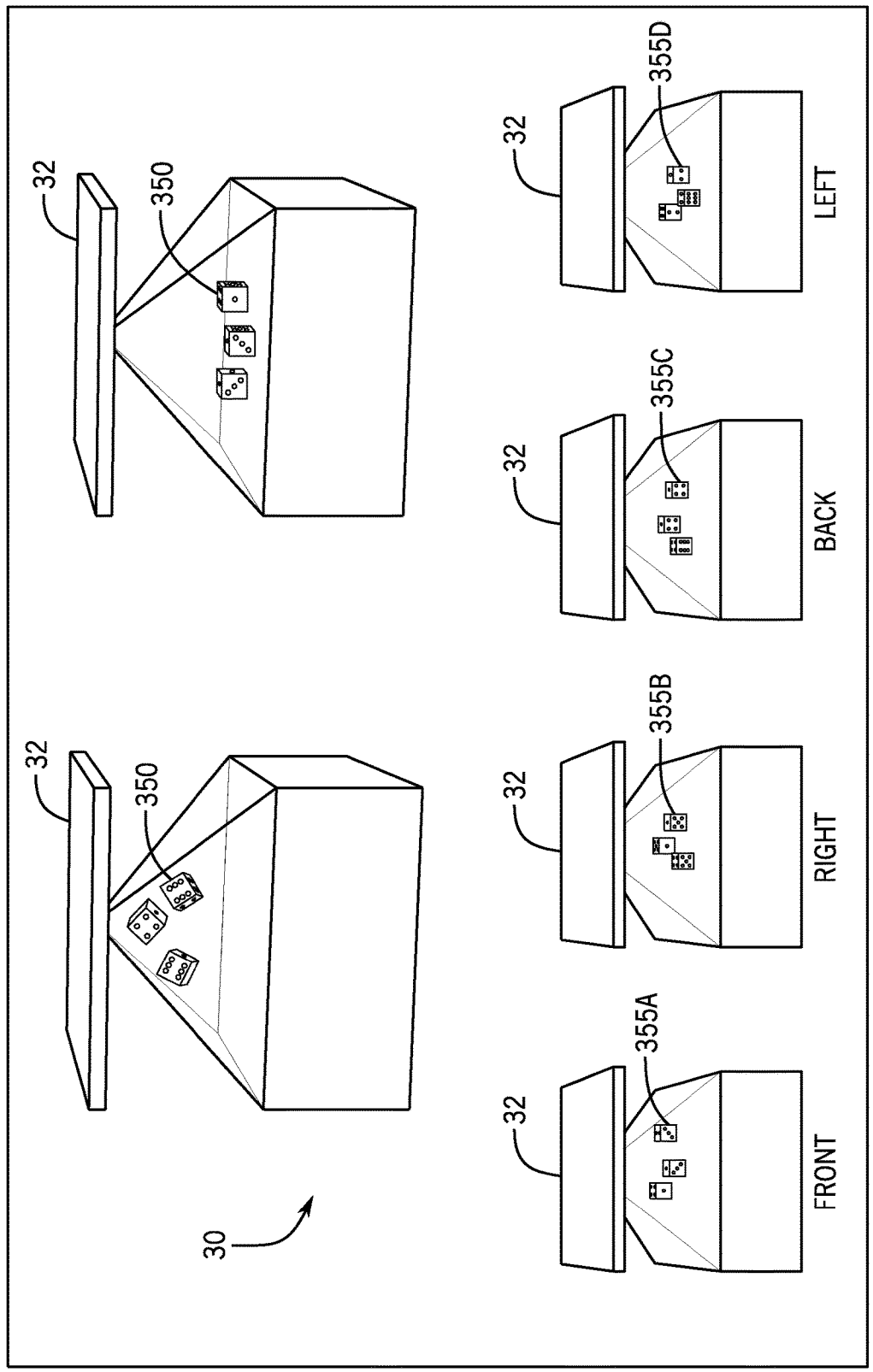
FIG. 12 depicts views of a reflective display assembly and the reflected images seen from specific positions around the display assembly, according to another embodiment of the present invention.

In yet another embodiment, the 3D object may be a dice cup containing some dice. FIG. 12 is a tableau of views of an embodiment of a reflective display assembly presenting dice as a 3D object. In the upper left view, the dice are shown in free-fall as if just tossed into the display assembly. The upper right view shows the dice at rest on the floor of the display assembly. In an embodiment, the top faces of the dice (at rest) indicate all or part of a randomly determined game outcome. The lower views depict the dice as seen from various positions (front-right-back-left) around the reflective display assembly, and the different views depict relative positions and exposed faces of the dice that correspond to the respective positions. Various other 3D objects may be envisioned and are considered to be within the scope and intent of the invention.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The foregoing description, for purposes of explanation, uses specific nomenclature and formula to provide a thorough understanding of the disclosed embodiments. It should be apparent to those of skill in the art that the specific details are not required in order to practice the disclosed embodiments. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A gaming system comprising:
an electronic display device facing a display direction;
game-logic circuitry configured to direct the electronic display device to display a plurality of views of a three-dimensional (3D) object related to a game being conducted by the game-logic circuitry, each of the views showing the 3D object from a different viewpoint; and
a plurality of reflectors proximate the electronic display device along the display direction, each reflector being directed toward a respective one of a plurality of positions disposed around the electronic display device, each reflector being configured to reflect one of the views of the 3D object toward the respective position.

2. The gaming system of claim 1, wherein the game-logic circuitry is further configured to reveal at least part of a randomly selected outcome of the game to participating players via programmed behavior of the 3D object.

3. The gaming system of claim 1, wherein one or more of the reflectors are at least partly transparent and wherein a player viewing the 3D object in the one or more reflectors can see another object positioned behind the one or more reflectors.

4. The gaming system of claim 1, wherein one or more of the reflectors are at least partly transparent, and wherein a player viewing the 3D object in the one or more reflectors can see another player viewing the 3D object in another one of the reflectors.

5. The gaming system of claim 1, wherein the plurality of reflectors are configured as respective sides of a pyramid.

6. The gaming system of claim 1, further comprising a gesture-sensing device configured to detect physical gestures proximate one of the positions, and wherein the game-logic circuitry is further configured to receive input signals from the gesture-sensing device corresponding to the detected physical gestures and to cause the 3D object to move responsive to the input signals.

7. The gaming system of claim 1, wherein the electronic display device comprises a plurality of individual display screens, each of the individual display screens displaying a respective one of the plurality of the views of the 3D game object.

8. The gaming system of claim 1, wherein the 3D object is a live dealer at a remote location and wherein the plurality of views are captured by respective cameras proximate the live dealer.

9. The gaming system of claim 1, wherein the 3D object is selected from a group consisting of a roulette wheel, one or more dice, currency, and one or more playing cards.

10. The gaming system of claim 1, wherein at least one of the reflectors is treated to alter a reflective characteristic of the untreated at least one reflector.

11. The gaming system of claim 1, wherein at least part of the display device is treated to limit visibility of the 3D object dependent on a viewing angle.

12. A method of displaying a 3D object related to a game on a gaming system to multiple players, the gaming system including an electronic display device facing a display direction, a plurality of reflectors proximate the electronic display device, each reflector being angled obliquely to the display direction, each reflector being directed at a respective one of a plurality of positions disposed around the electronic display device, the method comprising:
directing, by game-logic circuitry of the gaming system, the electronic display device to display a plurality of views of the 3D object, each of the views showing the 3D object from a different viewpoint; and
reflecting, by respective ones of the plurality of reflectors, respective ones of the views of the 3D object towards the plurality of positions.

13. The method of claim 12, wherein the viewpoint of the view reflected by each reflector of the plurality corresponds to the position to which the reflector is directed.

14. The method of claim 12, further comprising:
conducting, via the game-logic circuitry, a card game among the multiple players, wherein the 3D object includes a virtual dealer of the card game;
directing, by the game-logic circuitry, the electronic display device to display the virtual dealer turning to each position in succession and dealing one or more playing cards of a game hand to the respective position.

15. The method of claim 12, wherein the electronic display device comprises a large display screen and a separate central screen, the central screen displaying an image of the 3D object from an overhead viewpoint, the central screen projecting the image through a lens to present a simulated shadow of the 3D object on a floor of the reflective display assembly.

16. A gaming system comprising:
an electronic display device facing a display direction;
a 3D-object viewing application configured to capture a plurality of simultaneous views of a virtual 3D object related to a game in a 3D environment, each of the views showing the 3D object from a different viewpoint;
game-logic circuitry configured to:
initiate a game among multiple players positioned at a plurality of positions disposed around the electronic display device;
randomly determine a game outcome;
cause the 3D game object to move, responsive, at least in part, to the randomly determined game outcome; and
direct the electronic display device to display the plurality of simultaneous views of the moving 3D game object; and
a plurality of reflectors proximate the electronic display device, each reflector angled obliquely to the display direction, each reflector being directed at a respective one of the plurality of positions, and each reflector reflecting at least part of one of the simultaneous views of the moving 3D game object toward the respective position.

17. The gaming system of claim 16, wherein the 3D object includes a virtual roulette wheel spinning at a roulette table to indicate at least part of the randomly determined game outcome.

18. The gaming system of claim 16, wherein the 3D game object includes a pair of dice, wherein selected faces of the rolled dice indicate at least part of the randomly determined game outcome.

19. The gaming system of claim 16, further comprising a gesture-sensing device configured to detect physical gestures of a player proximate one of the positions, and wherein the game-logic circuitry is further configured to receive input signals corresponding to the detected physical gestures and to cause the 3D object to move responsive, at least in part, to the input signals.

20. The gaming system of claim 16, wherein the plurality of reflectors have a truncated pyramidal configuration, the gaming system further comprising a separate central screen disposed proximal the truncated top of the pyramidal plurality of reflectors, the central screen displaying an image of the 3D object from an overhead viewpoint, the central screen projecting the image through a lens to present a simulated shadow of the 3D object inside the reflective display assembly.

* * * * *